(12) United States Patent
Baker et al.

(10) Patent No.: US 7,562,247 B2
(45) Date of Patent: Jul. 14, 2009

(54) PROVIDING INDEPENDENT CLOCK FAILOVER FOR SCALABLE BLADE SERVERS

(75) Inventors: Marcus A. Baker, Apex, NC (US);
Justin P. Bandholz, Cary, NC (US);
Patrick M. Bland, Raleigh, NC (US);
Andrew S. Heinzmann, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 448 days.

(21) Appl. No.: 11/434,611

(22) Filed: May 16, 2006

(65) Prior Publication Data
US 2007/0294561 A1    Dec. 20, 2007

(51) Int. Cl.
*G06F 11/00* (2006.01)
*G06F 11/20* (2006.01)

(52) U.S. Cl. ............... 714/2; 714/3; 713/501; 713/503

(58) Field of Classification Search .......... 714/2, 714/3; 713/501, 503
See application file for complete search history.

(56) References Cited

U.S. PATENT DOCUMENTS

| | | | | |
|---|---|---|---|---|
| 4,653,054 A | * | 3/1987 | Liu et al. | 714/814 |
| 5,404,363 A | * | 4/1995 | Krause et al. | 714/814 |
| 5,479,648 A | * | 12/1995 | Barbera et al. | 713/322 |
| 5,642,069 A | | 6/1997 | Waite | |
| 6,349,391 B1 | | 2/2002 | Petivan et al. | |
| 6,516,422 B1 | * | 2/2003 | Doblar et al. | 713/503 |
| 6,631,483 B1 | * | 10/2003 | Parrish | 714/55 |
| 6,718,474 B1 | * | 4/2004 | Somers et al. | 713/322 |
| 6,754,171 B1 | * | 6/2004 | Bernier et al. | 370/216 |
| 6,839,391 B2 | | 1/2005 | Novak et al. | |
| 7,111,195 B2 | * | 9/2006 | Berkcan et al. | 714/12 |
| 7,124,315 B2 | * | 10/2006 | Espinoza-Ibarra et al. | 713/501 |
| 7,296,170 B1 | * | 11/2007 | Richmond et al. | 713/324 |
| 7,376,858 B2 | * | 5/2008 | Agne et al. | 713/600 |
| 7,467,320 B2 | * | 12/2008 | Chang et al. | 713/501 |
| 2002/0186718 A1 | | 12/2002 | Canciu et al. | |
| 2003/0101304 A1 | * | 5/2003 | King et al. | 710/301 |
| 2004/0044922 A1 | | 3/2004 | Wu | |
| 2004/0176920 A1 | | 9/2004 | Monfared et al. | |
| 2005/0281203 A1 | * | 12/2005 | Cherukuri et al. | 370/242 |

OTHER PUBLICATIONS

IBM; method to Synchronize EXA Blade Servers; www.ip.com; Dec. 13, 2004; 4 pgs.; www.ip.com No. IPCOM 000033489D; US.

\* cited by examiner

*Primary Examiner*—Scott T Baderman
*Assistant Examiner*—Joseph Schell
(74) *Attorney, Agent, or Firm*—John R. Biggers; Cynthia G. Seal; Biggers & Ohanian LLP.

(57) ABSTRACT

Methods and systems are disclosed for providing independent clock failover for scalable blade servers that include assigning a server blade to one of a plurality of clock failover groups, providing a plurality of independent clock signals to the clock generator of the server blade, wherein one of the plurality of independent clock signals is an active clock signal, detecting a failover condition for the clock failover group assigned to the server blade, and switching the active clock signal, in response to the detected failover condition, from one independent clock signal to another independent clock signal.

12 Claims, 7 Drawing Sheets

PROVIDING INDEPENDENT CLOCK FAILOVER FOR SCALABLE BLADE SERVERS

BACKGROUND OF THE INVENTION

1. Field of the Invention

The field of the invention is methods and systems for providing independent clock failover for scalable blade servers, and blade server chassis having independent clock failover capability.

2. Description of Related Art

In today's scalable computer systems such as, for example, the IBM® eServer® xSeries®, the clock domains between server blades are typically asynchronous. Asynchronous clock domains often create a problem for software running on multiple server blades because timestamp information derived from clock signals in different clock domains is often inconsistent. Consider the following two examples that explain the problems created by asynchronous clock domains.

The first example includes a scenario in which a task of a computer software application migrates between two server blades for execution. While the task executes on one server blade, the task may read the time counter. After migrating to the other server blade for execution, task may read the time counter again. Based on the elapsed time between reading the time counter while executing on the first server blade and reading the time counter while executing on the second server blade, the task may perform some action. Because the server blades may be operating in asynchronous clock domains, the task's second reading of the time counter may appear to the task to have occurred before the task's first reading of the time counter. The task, therefore, may generate an error. Such errors may be costly to debug and waste computer resources.

The second example includes a scenario in which an application log keeps track of the events of a software application executing on server blades in different clock domains. Because the local clock signals of each server blade may operate at slightly different frequencies, the system clocks that track the time of day for each server blade will not remain synchronized. Logging events using such unsynchronized system clocks has the potential to cause confusion because events may not be ordered correctly in the application log.

One current solution to these two problems above is for software developers to obtain the time from a system call to an operating system application programming interface ('API') that utilizes a global clock signal fanned out to all the server blades instead of using the local counter provided by the server blade's processor. Such a global clock signal allows the server blades to operate in the same clock domain. The drawback to this solution is that all software applications must be recoded to utilize the system call. A further disadvantage is that the system call to an operating system API may have a lower resolution than the local performance counter.

Another solution to the problems described above places all the server blades of a blade server chassis into a single clock domain governed by one global clock signal. In the event that a clock input fails for one of the server blades, a redundant global clock signal would provide a second clock domain into which all the server blades of the chassis could be switched. The current solution, therefore, allows all of the server blades to remain synchronized, but the current solution forces all of the server blades of a chassis to switch clock domains regardless of which server blade experienced the clock failure. Because all the server blades typically do not execute the same software application, this current solution often forces some server blade to switch clock domains unnecessarily.

SUMMARY OF THE INVENTION

Methods and systems are disclosed for providing independent clock failover for scalable blade servers that include assigning a server blade to one of a plurality of clock failover groups, providing a plurality of independent clock signals to the clock generator of the server blade, wherein one of the plurality of independent clock signals is an active clock signal, detecting a failover condition for the clock failover group assigned to the server blade, and switching the active clock signal, in response to the detected failover condition, from one independent clock signal to another independent clock signal.

A blade server chassis having independent clock failover capability is also disclosed that includes a plurality of server blades, a management module that assigns each server blade to one of a plurality of clock failover groups, and a plurality of independent clocks, each independent clock providing an independent clock signal to each server blade, wherein one of the independent clock signals is an active clock signal, and wherein each server blade includes a clock generator that detects a failover condition for the clock failover group assigned to the server blade of the clock generator, and switches the active clock signal, in response to the detected failover condition, from one independent clock signal to another independent clock signal.

A system of blade server chassis having independent clock failover capabilities is also disclosed that includes a plurality of blade server chassis, each blade server chassis having a plurality of server blades, each server blade having a clock generator, each blade server assigned to a clock failover group, and a plurality of independent clocks, each independent clock providing an independent clock signal to the clock generator of each server blade, wherein the clock generator of each server blade selects the same independent clock signal for use by each server blade assigned to the same clock failover group.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
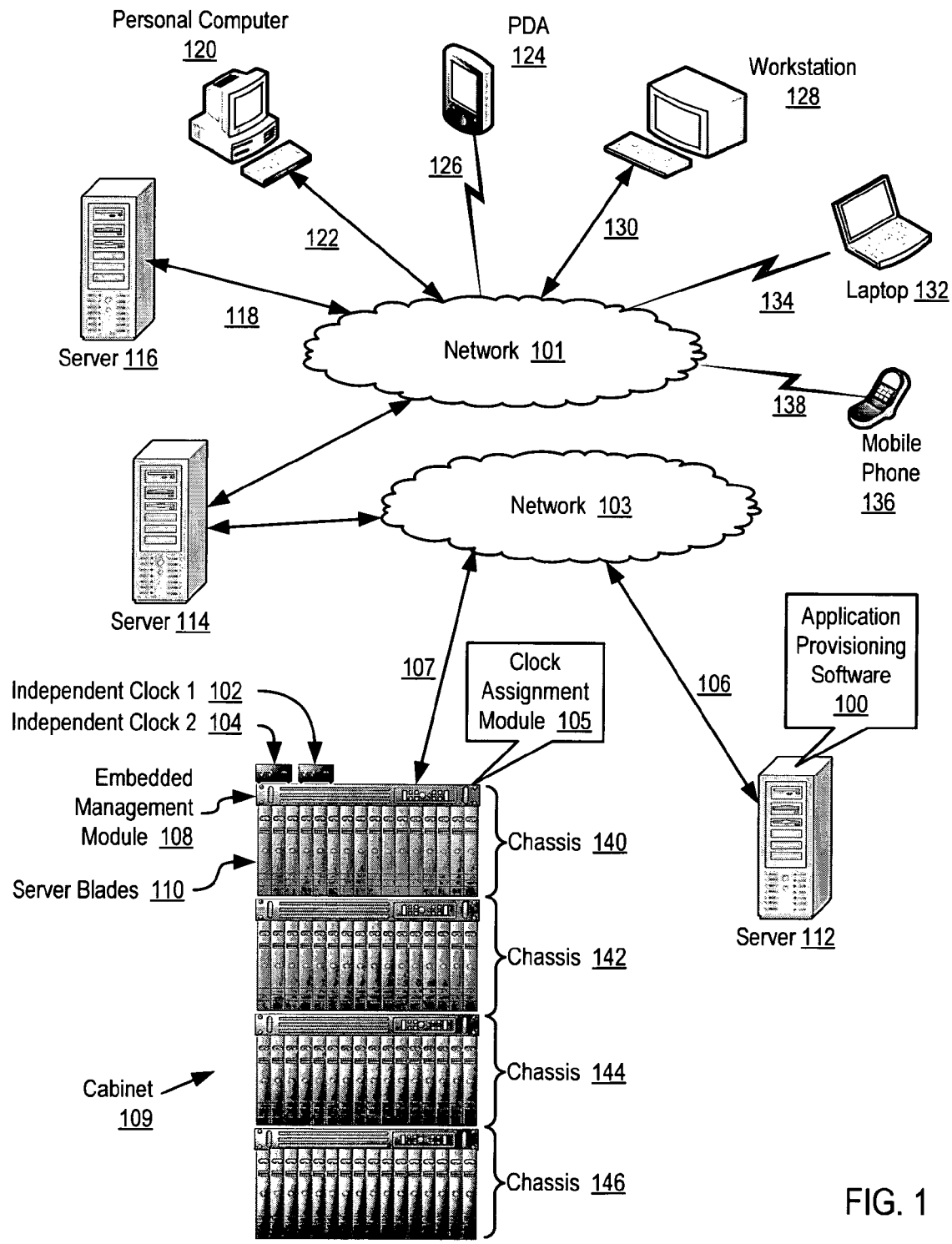
FIG. 1 sets forth a network diagram illustrating an exemplary system for providing independent clock failover for scalable blade servers according to embodiments of the present invention.

Exemplary methods, systems, and apparatus for providing independent clock failover for scalable blade servers according to embodiments of the present invention are described with reference to the accompanying drawings, beginning with FIG. 1. FIG. 1 sets forth a network diagram illustrating an exemplary system for providing independent clock failover for scalable blade servers according to embodiments of the present invention. The system of FIG. 1 operates generally to provide independent clock failover for scalable blade servers according to embodiments of the present invention by assigning a server blade to one of a plurality of clock failover groups, providing a plurality of independent clock signals to the clock generator of the server blade, wherein one of the plurality of independent clock signals is an active clock signal, detecting a failover condition for the clock failover group assigned to the server blade, and switching the active clock signal, in response to the detected failover condition, from one independent clock signal to another independent clock signal.

The system of FIG. 1 includes independent clocks (102, 104). Each independent clock (102, 104) is computer hardware that generates an independent clock signal for each server blade installed in the blade server chassis (140, 142, 144, 146) of FIG. 1. Although the clocks (102, 104) provide two independent clock signals to each blade server, each blade server only utilizes one of the independent clock signals at a time because a server blade must typically synchronize all timing operations on the server blade. The independent clock signal utilized for timing operations on the server blade at any particular time is referred to in this specification as the 'active clock signal' for a server blade. The clocks and their respective independent clock signals are referred to as 'independent' because the clock signals generated by each of the clocks (102, 104) are not synchronized and are completely redundant. That is, a failure of one independent clock does not affect the operation of the other independent clock. Although FIG. 1 depicts the clocks (102, 104) as external modules outside of the chassis of FIG. 1, such a depiction is for explanation and not for limitation. Readers of skill in the art will recognize that independent clocks (102, 104) may also be implemented as modules that plug into the mid-plane of a chassis.

The system of FIG. 1 includes blade server chassis (140). Blade server chassis (140) is installed in a cabinet (109) with several other blade server chassis (142, 144, 146). Each blade server chassis is computer hardware that houses and provides common power, cooling, network, storage, and media peripheral resources to one or more server blades. Each blade server chassis in the example of FIG. 1 includes multiple power supplies for providing power to server blades that includes load balancing and failover capabilities such as, for example, a hot-swappable power supply with 1400-watt or greater direct current output. The redundant power supply configuration ensures that the blade server chassis (140) will continue to provide electrical power to the server blades if one power supply fails. Examples of blade server chassis that may be improved according to embodiments of the present invention include the IBM eServer® BladeCenter™ Chassis, the Intel® Blade Server Chassis SBCE, the Dell™ PowerEdge 1855 Enclosure, and so on.

In the system of FIG. 1, each blade server chassis includes an embedded management module (108) having installed upon it a clock assignment module (105). The embedded management module (108) is an embedded computer system for controlling resources provided by each blade server chassis (140) to one or more server blades and for managing the server blades installed in the chassis (140). The resources controlled by the embedded blade server management module (108) may include, for example, power resources, cooling resources, network resources, storage resources, media peripheral resources, and so on. An example of an embedded management module (108) that may be improved for providing independent clock failover for scalable blade servers according to embodiments of the present invention includes the IBM eServer™ BladeCenter® Management Module.

The clock assignment module (105) of FIG. 1 is a set of computer program instructions for providing independent clock failover for scalable blade servers according to embodiments of the present invention. In the example of FIG. 1, the clock assignment module (105) operates generally for providing independent clock failover for scalable blade servers according to embodiments of the present invention by assigning a server blade to one of a plurality of clock failover groups. A clock failover group is a group of server blades that utilizes the same independent clock signal as the active clock signal for each server blade and that switches the active clock signal from one independent clock signal to another independent clock signal in response to a failover condition occurring on any of the server blades in the group. A failover condition is a condition that occurs on a server blade when the server blade generates a failover signal. A failover signal is a signal generated by a server blade when an error condition occurs for the active clock signal. An error condition is a condition in which the active clock signal for a server blade is no longer suitable for timing operations on the server blade. An error condition may result, for example, when one of the independent clocks fail, a hardware malfunction occurs on the blade server, a connection to an independent clock is severed, and so on.

The blade server chassis (140) in the system of FIG. 1 includes server blades (110) that execute computer software applications. A computer software application is computer program instructions for user-level data processing implementing threads of execution. Server blades (110) are minimally-packaged computer motherboards that include one or more computer processors, computer memory, and network interface modules. The server blades (110) are hot-swappable and connect to a backplane of a blade server chassis through a hot-plug connector. Blade server maintenance personnel insert and remove server blades (110) into slots of a blade server chassis to provide scalable computer resources in a computer network environment. Each of the server blades (110) of chassis (140) include computer hardware for providing independent clock failover for scalable blade servers according to embodiments of the present invention by assigning a server blade to one of a plurality of clock failover groups, providing a plurality of independent clock signals to the clock generator of the server blade, wherein one of the plurality of independent clock signals is an active clock signal, detecting a failover condition for the clock failover group assigned to the server blade, and switching the active clock signal, in response to the detected failover condition, from one independent clock signal to another independent clock signal. In the system of FIG. 1, server blades (110) connect to network (103) through wireline connection (107) and a network switch installed in a blade server chassis. Examples of server blades (110) that may be improved according to embodiments of the present invention include the IBM eServer® BladeCenter™ HS20, the Intel® Server Compute Blade SBX82, the Dell™ PowerEdge 1855 Blade, and so on.

The system of FIG. 1 includes server (112) connected to network (103) through wireline connection (106). Server (112) has installed upon it application provisioning software (100). The application provisioning software (100) is a set of computer program instructions that manages the execution of computer software applications on a plurality of server blades and provides independent clock failover for scalable blade servers according to embodiments of the present invention. In the system of FIG. 1, the application provisioning software (100) assigns computer software applications for execution on server blades (110) by assigning a blade server to a scalable group and assigning a computer software application to the scalable group for execution by the server blades of the group. A scalable group is a group of computer resources available to the application provisioning software (100) for execution of a software application. The group is referred to as 'scalable' because computer resources may be added or removed from the group as computing needs and computing environments change. In the example of FIG. 1, the application provisioning software (100) operates generally to provide independent clock failover for scalable blade servers according to embodiments of the present invention by assigning a server blade to one of a plurality of clock failover groups. The application provisioning software (100) typically assigns all the server blades in a scalable group to the same clock failover group because such an assignment advantageously allows operational timing synchronization of all the server blades executing the threads from the same software application.

In the example of FIG. 1, the application provisioning software (100) assigns computer software applications for execution on server blades in response to receiving distributed application requests for processing from other devices. Distributed application requests may include, for example, an HTTP server requesting data from a database to populate a dynamic server page or a remote application requesting an interface to access a legacy application.

The system of FIG. 1 includes a number of devices (116, 120, 124, 128, 132, 136) operating as sources for distributed application requests, each device connected for data communications in networks (101, 103). The server (116) connects to the network (101) through the wireline connection (118). The personal computer (120) connects to the network (101) through the wireline connection (122). The Personal Digital Assistant ('PDA') (124) connects to the network (101) through the wireless connection (126). The workstation (128) connects to the network (101) through the wireline connection (130). The laptop (132) connects to the network (101) through the wireless connection (134). The network enabled mobile phone (136) connects to the network (101) through the wireless connection (138).

In the example of FIG. 1, the server (114) operates as a gateway between the network (101) and the network (103). The network connection aspect of the architecture of FIG. 1 is only for explanation, not for limitation. In fact, systems for controlling the allocation of power to a plurality of computers whose supply of power is managed by a common power manager according to embodiments of the present invention may be connected as LANs, WANs, intranets, internets, the Internet, webs, the World Wide Web itself, or other connections as will occur to those of skill in the art. Such networks are media that may be used to provide data communications connections between various devices and computers connected together within an overall data processing system.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example the Transmission Control Protocol ('TCP'), the Internet Protocol ('IP'), the HyperText Transfer Protocol ('HTTP'), the Wireless Access Protocol ('WAP'), the Handheld Device Transport Protocol ('HDTP'), and others as will occur to those of skill in the art. Various embodiments of the present invention may be implemented on a variety of hardware platforms in addition to those illustrated in FIG. 1.

Figure 2:
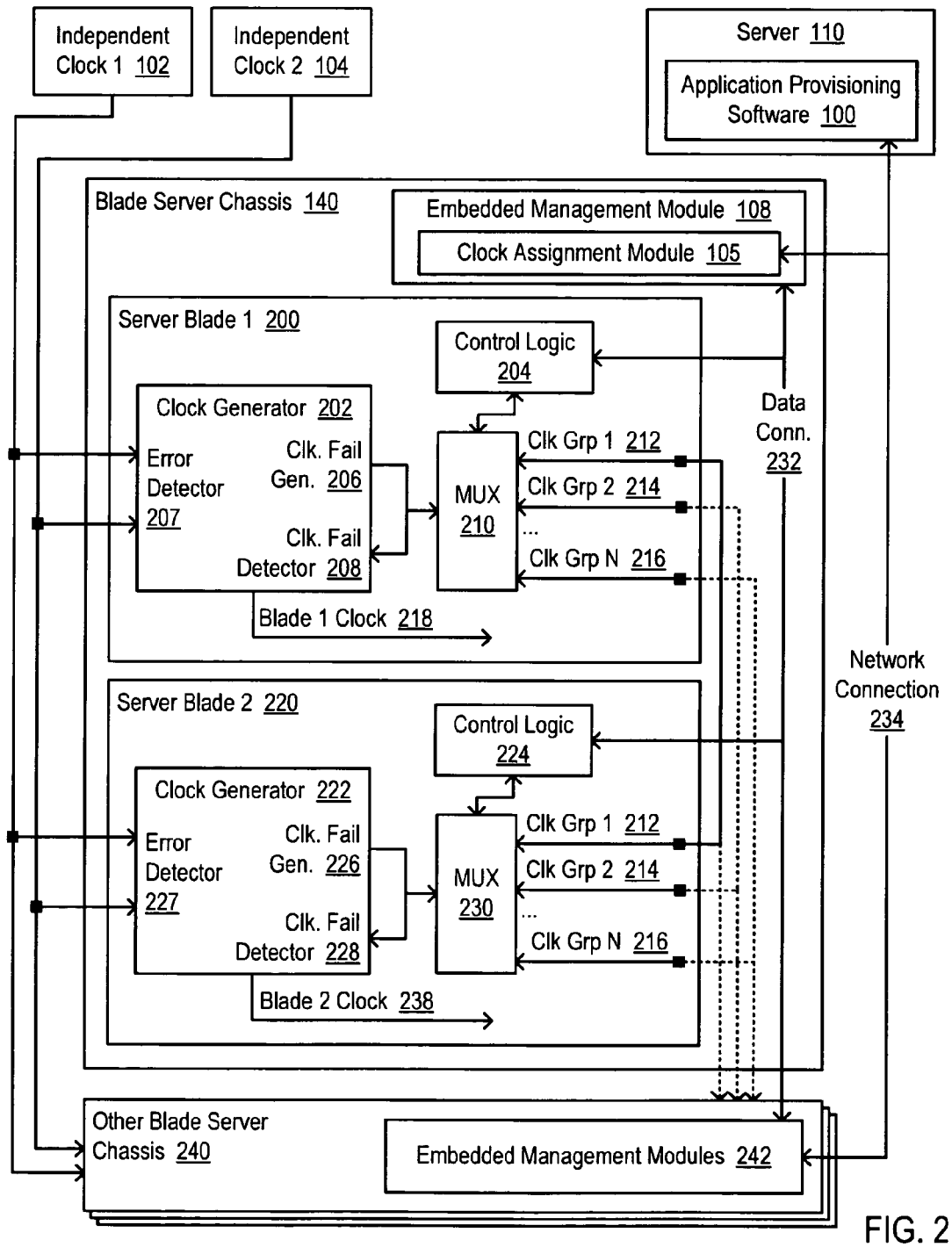
FIG. 2 sets forth a block diagram of computer software and computer hardware useful in providing independent clock failover for scalable blade servers according to embodiments of the present invention.

Providing independent clock failover for scalable blade servers in accordance with the present invention is generally implemented using a combination of computer software and computer hardware. For further explanation, therefore, FIG. 2 sets forth a block diagram of computer software and computer hardware useful in providing independent clock failover for scalable blade servers according to embodiments of the present invention. The exemplary system of FIG. 2 includes independent clock 1 (102) and independent clock 2 (104). Each exemplary independent clock (102, 104) of FIG. 2 is computer hardware that provide an independent clock signal for the server blades (200, 220) installed in the blade server chassis (140) and the server blades (not shown) installed in other blade server chassis (240). In the exemplary system of FIG. 2, the active clock signal for each server blade defaults at power-on to the independent clock signal from the independent clock 1 (102). The management module of each blade server chassis, however, may set the active clock signal to any of the independent clock signal available.

The exemplary system of FIG. 2 includes a blade server chassis (140) having an embedded management module (108) and other blade server chassis (240) having embedded management modules (242). In the exemplary system of FIG. 2, blade server chassis (140) includes a server blade 1 (200) and a server blade 2 (220). The blade server 1 (200) includes a clock generator (202) that provides a blade 1 clock (218) for timing operations of the other components of the server blade 1 (200). The blade 1 clock (218) supplies the server blade 1 (200) with a system clock signal generated by the clock generator (202) from the active clock signal selected from the independent clock signals provided by clocks (102, 104). In a similar manner, the blade server 2 (220) includes a clock generator (222) that provides a blade 2 clock (238) for timing operations of the other components of the server blade 2 (220). The blade 2 clock (238) supplies the server blade 2 (220) with a system clock signal generated by the clock generator (222) from the active clock signal selected from the independent clock signals provided by clocks (102, 104).

In the exemplary system of FIG. 2, the embedded management module (108) has installed upon it a clock assignment module (105). The clock assignment module (105) is a set of computer program instructions for assigning a server blade to one of a plurality of clock failover groups according to embodiments of the present invention. The clock assignment module (105) may assign a server blade to one of a plurality of clock failover groups by assigning a server blade to one of the plurality of clock failover groups in dependence upon membership to a scalable group or by receiving from application provisioning software an assignment to one of the plurality of clock failover groups.

The exemplary system of FIG. 2 also includes server (110) having installed upon it application provisioning software (100). The application provisioning software (100) is a set of computer program instructions for assigning a server blade to one of a plurality of clock failover groups according to embodiments of the present invention. In the example of FIG. 2, the application provisioning software (100) connects to the clock assignment modules of the embedded management modules (108, 242) through a network connection (234) such as, for example, a TCP/IP connection.

As mentioned above, the clock assignment module (105) assigns a server blade to one of a plurality of clock failover groups. In the exemplary system of FIG. 2, the clock failover groups are clock group 1 (212), clock group 2 (214), through clock group N (216). Each clock failover group of FIG. 2 is implemented as an electrical conductor that connects to a multiplexer ('MUX') on each server blade installed in the blade server chassis (140) and other blade server chassis (240). Server blade 1 (200) of FIG. 2 includes control logic (204) that assigns server blade 1 (200) to a clock failover group by providing a selection signal to a multiplexer (210) of the server blade 1 (200). The multiplexer (210) connects the clock generator (202) to any one of the clock groups (212, 214, 216) in dependence upon a selection signal provided by control logic (204). In a similar manner, server blade 2 (220) of FIG. 2 includes control logic (224) that assigns server blade 2 (220) to a clock failover group by providing a selection signal to a multiplexer (230) of the server blade 2 (220). The multiplexer (230) connects the clock generator (222) to any one of the clock groups (212, 214, 216) in dependence upon a selection signal provided by control logic (224). Although FIG. 2 depicts the control logic (204, 224) and the multiplexers (210, 230) installed on each server blade (200, 220), such is for explanation and not for limitation. In fact, the control logic (204, 224) and the multiplexers (210, 230) may be installed on a mid-plane of each blade server chassis.

In the example of FIG. 2, the clock assignment module (105) controls the selection signal provided by control logic (204, 224) through a data connection (232). The data connection (232) may be implemented using, for example, the Inter-Integrated Circuit ('I²C') Bus Protocol. The I²C Bus Protocol is a serial computer bus protocol for connecting electronic components inside a computer that was first published in 1982 by Philips. I²C is a simple, low-bandwidth, short-distance protocol. Most available I²C devices operate at speeds up to 400 Kbps, although some I²C devices are capable of operating up at speeds up to 3.4 Mbps. I²C is easy to use to link multiple devices together since it has a built-in addressing scheme. Current versions of the I²C have a 10-bit addressing mode with the capacity to connect up to 1008 nodes. Although the data connection (232) between the clock assignment module (105) and the control logic (204, 224) may be implemented using I²C, such an implementation is for explanation and not for limitation. Implementing the data connection using the I²C Protocol is for explanation only, and not for limitation. The data connection may also be implemented using other protocols such as the Serial Peripheral Interface ('SPI') Bus Protocol, the Microwire Protocol, the System Management Bus ('SMBus') Protocol, and so on.

As mentioned above, the clock generators (202, 222) select the active clock signal for each server blade (200, 220) from the independent clock signals provided by clocks (102, 104). In the example of FIG. 2, the clock generator (202) includes an error detector (207). The error detector (207) is a sub-component of the clock generator (202) that detects an error condition for the active clock signal. As mentioned above, an error condition is a condition in which the active clock signal for a server blade is no longer suitable for timing operations on the server blade. The clock generator (202) also includes a clock failure signal generator (206). The clock failure signal generator (206) is a sub-component of the clock generator (202) that generates a failover signal in response to an error condition detected by the clock generator (202). The clock generator (202) also includes a clock failure detector (208). The clock failure detector (208) is a sub-component of the clock generator (202) that detects a failover signal generated by another clock generator in the same clock failover group such as, for example, clock generator (222). In addition, the clock failure detector (208) operates as a toggle switch to control which independent clock signal is the active clock signal at any point in time. For example, each time the clock failure detector (208) receives an electric pulse, the clock generator (202) may switch to the next independent clock signal in the plurality of independent clock signal provided by the independent clocks to the server blade 1 (200). In the example of FIG. 2, clock generator (222) of the server blade 2 (220) also includes such sub-components as an error detector (227), a clock failure signal generator (226), and a clock failure detector (228) that are the same as the sub-components (206, 207, 208) of clock generator (202).

In the exemplary system of FIG. 2, the clock assignment module (105) assigns server blade 1 (200) and server blade 2 (220) to clock group 1 (212) using control logic (204, 224) and multiplexers (210, 230). For explanation and clarity, the electrical conductor connecting the multiplexer (210) to the multiplexer (230) that implements clock group 1 (212) is depicted using a solid line, while the other electrical conductors implementing other clock groups are depicted as dotted lines. The solid line indicates that the clock generator (202) of server blade 1 (200) and the clock generator (222) of server blade 2 (220) is connected through multiplexers (210, 230) based on the selection signal provided by control logic (204, 224). Because the clock generators (202, 222) are connected, a failover signal generated by either clock generator (202, 222), in response to detecting an error condition for their active clock signal, will be detected by the clock failover detector of other clock generator. In addition, because the clock failover signal generator of each clock generator (202, 220) loops back and connects to the clock failure detector (208, 228) of same clock generator, a failover signal generated by one clock generator will be detected by the clock failover detector of the same clock generator. When such a failure signal is generated by either clock generator, therefore, both clock generators (202, 220) switch the active clock signal to the next independent clock signal in the plurality of independent clock signal at the same time. The system of FIG. 2 that operates generally for providing independent clock failover for scalable blade servers, therefore, advantageously allows continuous operational timing synchronization of all the server blades assigned to the same clock failover group before and after a clock failure.

Readers will note that the clock assignment module (105) and the application provisioning software (100) in the example of FIG. 2 are software modules executing on the embedded management module (108) and the server (110) respectively. The embedded management module (108) and the server (110) used in aspects of the invention are generally implemented with computers, that is, with automated computing machinery. Furthermore, all the nodes, servers, and communications devices in the exemplary system of FIG. 1 are implemented to some extent at least as computers. For further explanation, therefore, FIG. 3 sets forth a block diagram of automated computing machinery comprising an exemplary computer (152) useful in providing independent clock failover for scalable blade servers according to the present invention. The computer (152) of FIG. 3 includes at least one computer processor (156) or 'CPU' as well as random access memory (168) ('RAM') which is connected through a system bus (160) to processor (156) and to other components of the computer.

Stored in RAM (168) is application provisioning software (100). The application provisioning software (100) is a set of computer program instructions for managing the execution of computer software applications on a plurality of server blades and improved for providing independent clock failover for scalable blade servers according to embodiments of the present invention. The application provisioning software (100) operates generally for providing independent clock failover for scalable blade servers according to embodiments of the present invention by assigning a server blade to one of a plurality of clock failover groups. Also stored in RAM (168) is a clock assignment module (105). The clock assignment module (105) is a set of computer program instructions improved for providing independent clock failover for scalable blade servers according to embodiments of the present invention. The clock assignment module (105) operates generally for providing independent clock failover for scalable blade servers according to embodiments of the present invention by assigning a server blade to one of a plurality of clock failover groups.

Also stored in RAM (168) is an operating system (154). Operating systems useful in computers according to embodiments of the present invention include UNIX™, Linux™, Microsoft XP™, AIX™, IBM's i5/OS™, and others as will occur to those of skill in the art. A typical operating system may be used to control the execution of threads by the processor (156) in the exemplary computer (152). The operating system (154), the application provisioning software (100), and the clock assignment module (105) in the example of FIG. 3 are shown in RAM (168), but many components of such software typically are stored in non-volatile memory (166) also.

Figure 3:
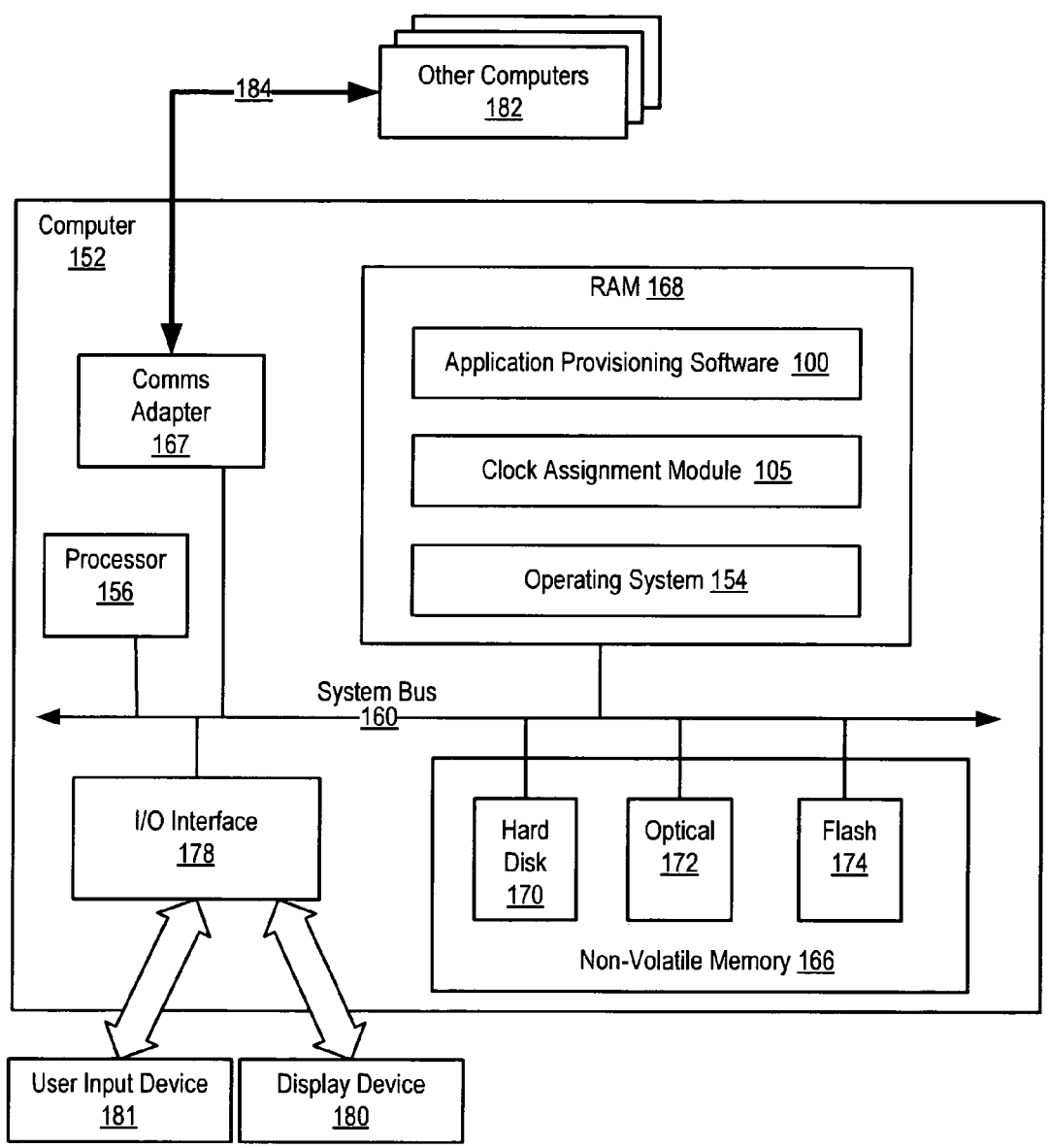
FIG. 3 sets forth a block diagram of automated computing machinery comprising an exemplary computer useful in providing independent clock failover for scalable blade servers according to embodiments of the present invention.

Computer (152) of FIG. 3 includes non-volatile computer memory (166) coupled through a system bus (160) to processor (156) and to other components of the computer (152). Non-volatile computer memory (166) may be implemented as a hard disk drive (170), optical disk drive (172), electrically erasable programmable read-only memory space (so-called 'EEPROM' or 'Flash' memory) (174), RAM drives (not shown), or as any other kind of computer memory as will occur to those of skill in the art.

The example computer of FIG. 3 includes one or more input/output interface adapters (178). Input/output interface adapters in computers implement user-oriented input/output through, for example, software drivers and computer hardware for controlling output to display devices (180) such as computer display screens, as well as user input from user input devices (181) such as keyboards and mice.

The exemplary computer (152) of FIG. 3 includes a communications adapter (167) for implementing data communications (184) with other computers (182). Such data communications may be carried out serially through RS-232 connections, through external buses such as the Universal Serial Bus ('USB'), through data communications networks such as IP networks, and in other ways as will occur to those of skill in the art. Communications adapters implement the hardware level of data communications through which one computer sends data communications to another computer, directly or through a network. Examples of communications adapters useful for providing independent clock failover for scalable blade servers according to embodiments of the present invention include modems for wired dial-up communications, Ethernet (IEEE 802.3) adapters for wired network communications, and 802.11b adapters for wireless network communications.

Figure 4:
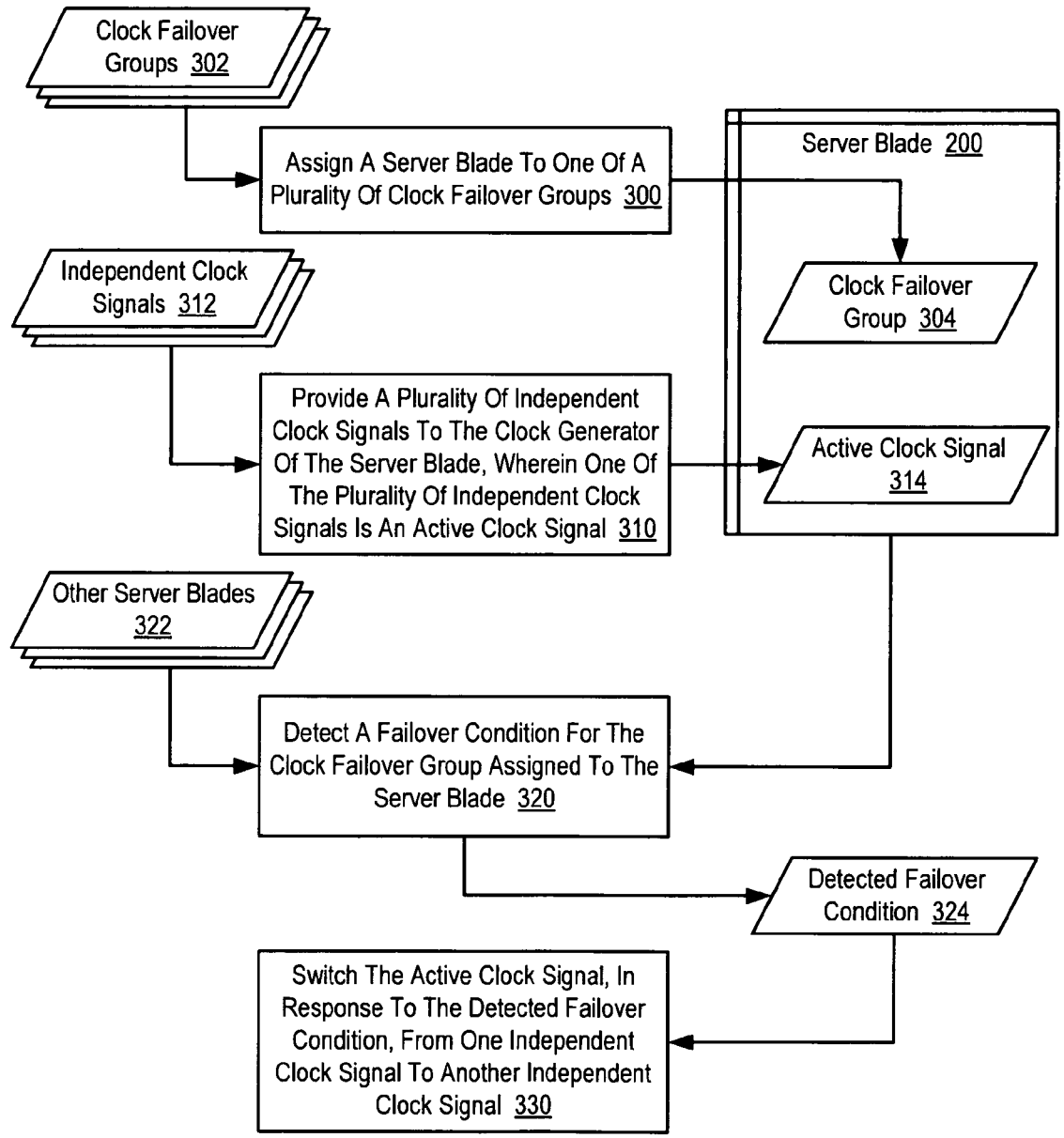
FIG. 4 sets forth a flow chart illustrating an exemplary method for providing independent clock failover for scalable blade servers according to embodiments of the present invention.

For further explanation, FIG. 4 sets forth a flow chart illustrating an exemplary method for providing independent clock failover for scalable blade servers according to embodiments of the present invention. The method of FIG. 4 includes assigning (300) a server blade (200) to one clock failover group (304) of a plurality of clock failover groups (302). As mentioned above, a clock failover group is a group of server blades utilizing the same independent clock signal as the active clock signal for each server blade. Server blades assigned to the same clock failover group also switch the active clock signal from one independent clock signal to another independent clock signal in response to a failover condition occurring on any of the server blades in the group. Assigning (300) a server blade to one of a plurality of clock failover groups according to the method of FIG. 4 may be carried out by assigning by a management module, control logic, and a multiplexer a server blade to one of the plurality of clock failover groups in dependence upon membership to a scalable group, or by receiving by a management module from application provisioning software an assignment to one of the plurality of clock failover groups as discussed below with reference to FIG. 5.

The method of FIG. 4 also includes providing (310) a plurality of independent clock signals (312) to the clock generator of the server blade (200), wherein one of the plurality of independent clock signals (312) is an active clock signal (314). Providing (310) a plurality of independent clock signals (312) to the clock generator of the server blade (200) according to the method of FIG. 4 may be carried out by transmitting the independent clock signals (312) by a plurality of independent clocks connected to the server blade (200) and selecting by the server blade (200) the active clock signal (314) for use in timing operations on the server blade (200).

The method of FIG. 4 also includes detecting (320) a failover condition (324) for the clock failover group (304) assigned to the server blade (200). Readers will recall from above that a failover condition is a condition that occurs on a server blade when the server blade generates a failover signal. Detecting (320) a failover condition (324) for the clock failover group (304) assigned to the server blade (200) may be carried out by receiving by the clock generator of the server blade (200) a failover signal from the clock generator of the same server blade (200) or the clock generator of the other server blades (322) assigned to the same clock failover group (304). For further explanation, detecting a failover condition for the clock failover group assigned to the server blade according to the method of FIG. 4 may also be carried out by detecting by the clock generator an error condition for the active clock signal, generating by the clock generator, in response to the detected error condition, a failover signal, or detecting a failover signal generated by another clock generator as discussed below with reference to FIGS. 6 and 7.

The method of FIG. 4 also includes switching (330) the active clock signal, in response to the detected failover condition (324), from one independent clock signal to another independent clock signal. Switching (330) the active clock signal, in response to the detected failover condition (324), from one independent clock signal to another independent clock signal may be carried out by switching by the clock generator of the server blade (200) from one independent clock signal to another independent clock signal in a round-robin fashion or in some other predetermined order programmed into a state machine of the clock generator. Regardless of the order in which switching (330) the active clock signal from one independent clock signal to another independent clock signal occurs, all of the clock generators of all the server blades in the same failover group switch clock signals in the same order. That is, all the server blade in a clock failover group are synchronized to the same clock signal both before and after the switch from one independent clock signal to another independent clock signal occurs.

As mentioned above, assigning a server blade to one of a plurality of clock failover groups may be carried out by receiving from application provisioning software an assignment to one of the plurality of clock failover groups. For further explanation, FIG. 5 sets forth a flow chart illustrating a further exemplary method for providing independent clock failover for scalable blade servers according to embodiments of the present invention that includes receiving (402) from application provisioning software (100) an assignment to one of the plurality of clock failover groups.

Figure 5:
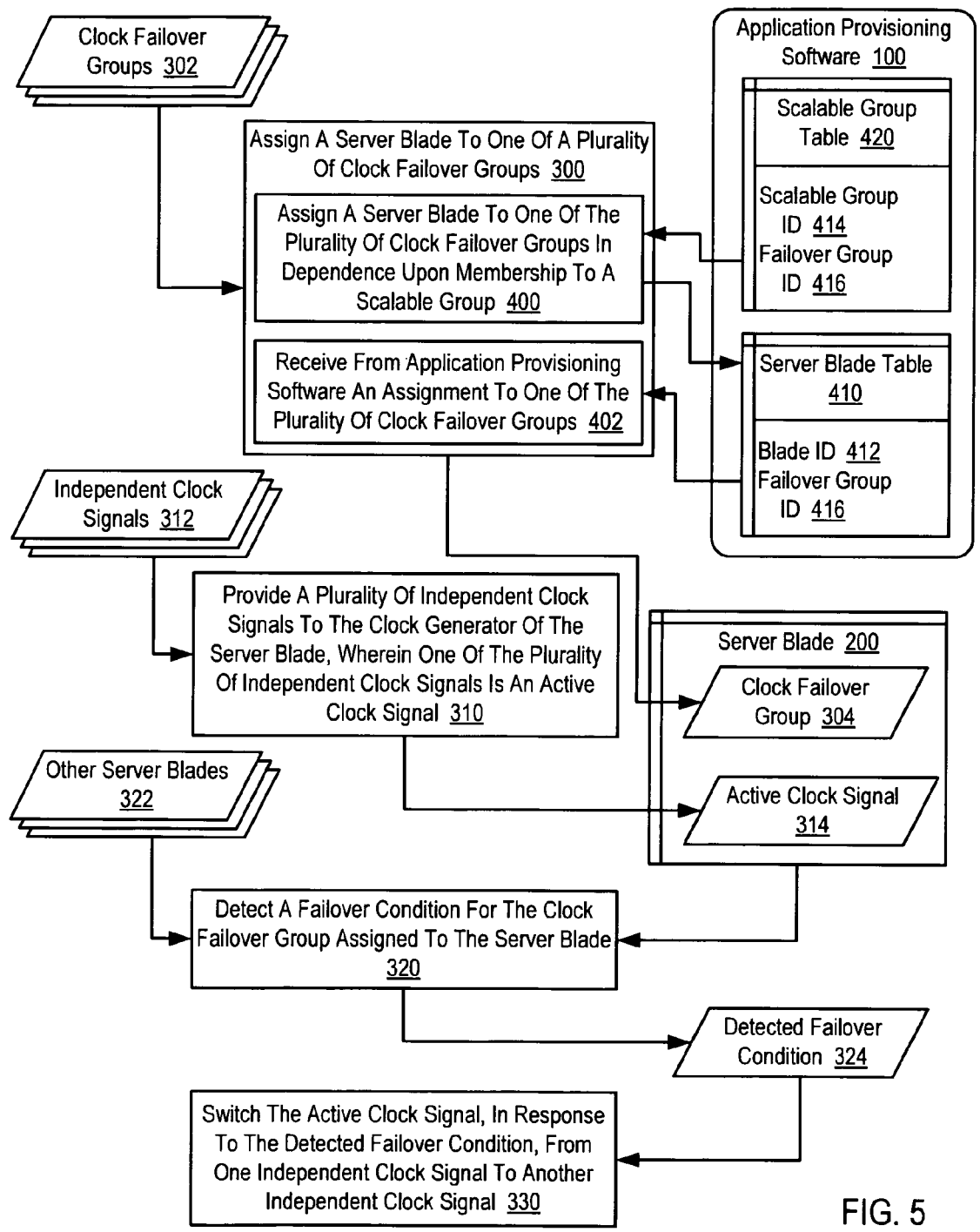
FIG. 5 sets forth a flow chart illustrating a further exemplary method for providing independent clock failover for scalable blade servers according to embodiments of the present invention.

The method of FIG. 5 is similar to the method of FIG. 4. That is, the method of FIG. 5 is similar to the method of FIG. 4 in that the method of FIG. 5 also includes assigning (300) a server blade to one of a plurality of clock failover groups, providing (310) a plurality of independent clock signals to the clock generator of the server blade, wherein one of the plurality of independent clock signals is an active clock signal, detecting (320) a failover condition for the clock failover group assigned to the server blade, and switching (330) the active clock signal, in response to the detected failover condition, from one independent clock signal to another independent clock signal. In addition, the example of FIG. 5 is similar to the example of FIG. 4 in that the example of FIG. 5 also includes clock failover groups (302), server blade (200), clock failover group (304), independent clock signals (312), active clock signal (314), other server blades (322), and detected failover condition (324).

In the method of FIG. 5, assigning (300) a server blade to one of a plurality of clock failover groups includes assigning (400) a server blade to one of the plurality of clock failover groups in dependence upon membership to a scalable group. Assigning (400) a server blade to one of the plurality of clock failover groups in dependence upon membership to a scalable group may be carried out in application provisioning software (100). As discussed above, the application provisioning software (100) is computer software that manages the execution of computer software applications on a plurality of server blades. The application provisioning software (100) manages execution of software applications by assigning a blade server to a scalable group and assigning a computer software application to the scalable group for execution by the server blades of the group. To synchronize the execution of the software application, the application provisioning software may assign server blades in the same scalable group to the same clock failover group.

In the example of FIG. 5, the application provisioning software (100) includes a scalable group table (420) and a server blade table (410). The scalable group table (420) associates a scalable group identifier (414) with a clock failover group identifier (416). The scalable group identifier (414) represents the scalable group to which applications are assigned for execution. The clock failover group identifier (416) represents the clock failover group to which the server blades of a scalable group represented by the associated scalable group identifier (414) are assigned. The server blade table (410) associates a blade identifier (412) with a clock failover group identifier (416). The blade identifier (412) represents a server blade managed by the application provisioning software (100). The clock failover group identifyer (416) represents the clock failover group to which a server blade represented by the associated server blade identifier (412) is assigned.

In the method of FIG. 5, assigning (400) a server blade to one of the plurality of clock failover groups in dependence upon membership to a scalable group may be carried out by retrieving by application provisioning software (100) the failover group identifier (416) associated with the identifier (414) for the scalable group to which the server blade is assigned from the scalable group table (420). Assigning (400) a server blade to one of the plurality of clock failover groups in dependence upon membership to a scalable group may further be carried out by associating by application provisioning software (100) the retrieved failover group identifier (416) with the identifier (412) for the server blade in the server blade table (410).

In the method of FIG. 5, assigning (300) a server blade to one of a plurality of clock failover groups includes receiving (402) from application provisioning software (100) an assignment to one of the plurality of clock failover groups. Receiving (402) from application provisioning software (100) an assignment to one of the plurality of clock failover groups may be carried out by a management module embedded in a blade server chassis. Receiving (402) from application provisioning software (100) an assignment to one of the plurality of clock failover groups may be carried out through a data communication connection between a management module and the application provisioning software (100) such as, for example, a TCP/IP connection. The remainder of the method of FIG. 5 may then continue to be carried out as discussed above with reference to FIG. 4.

As mentioned above, detecting a failover condition for the clock failover group assigned to the server blade may be carried out by detecting by the clock generator an error condition for the active clock signal and generating by the clock generator, in response to the detected error condition, a failover signal. For further explanation, FIG. 6 sets forth a flow chart illustrating a further exemplary method for providing independent clock failover for scalable blade servers according to embodiments of the present invention that includes detecting (500) by the clock generator an error condition for the active clock signal and generating (502) by the clock generator, in response to the detected error condition, a failover signal.

Figure 6:
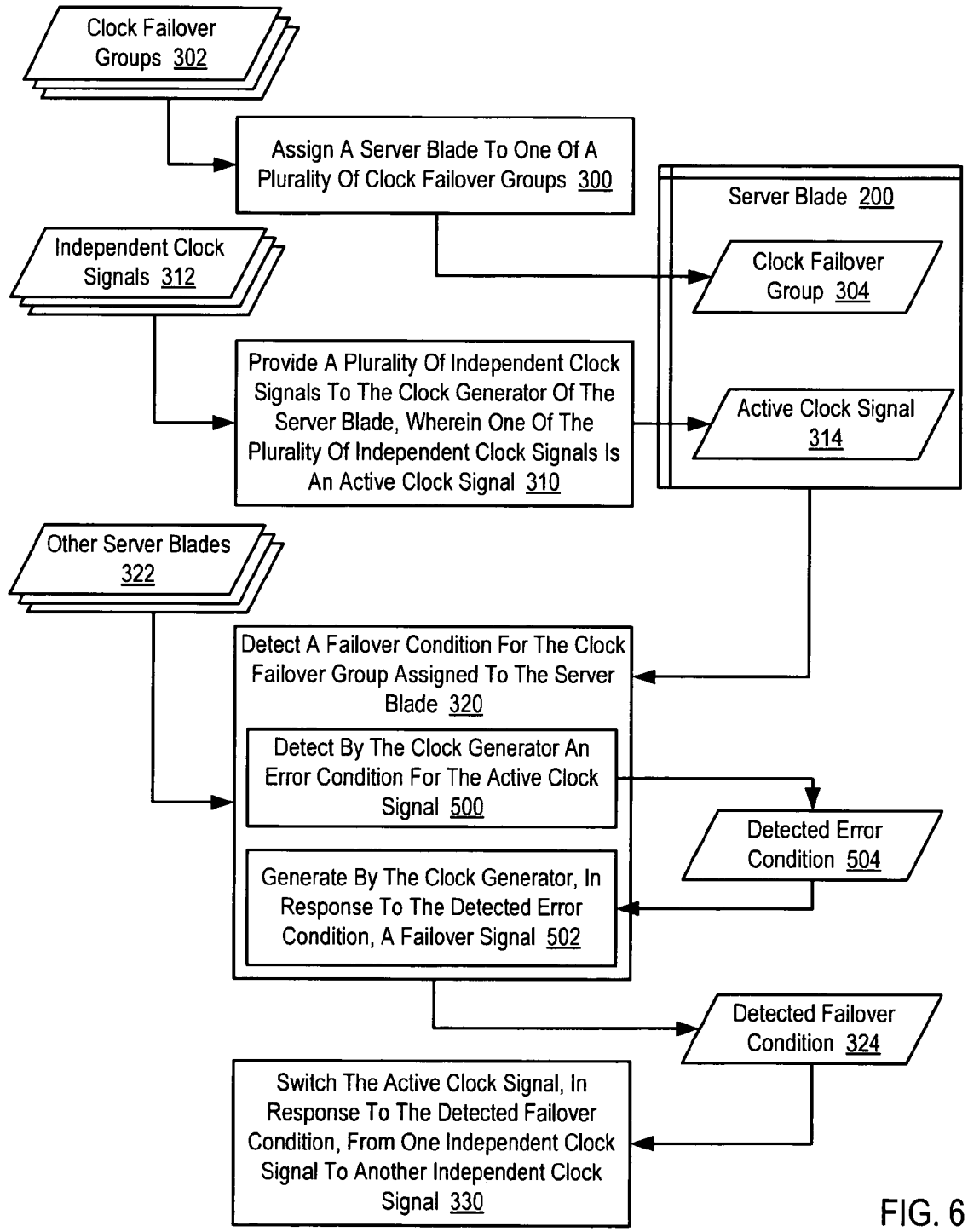
FIG. 6 sets forth a flow chart illustrating a further exemplary method for providing independent clock failover for scalable blade servers according to embodiments of the present invention.

The method of FIG. 6 is similar to the method of FIG. 4. That is, the method of FIG. 6 is similar to the method of FIG. 4 in that the method of FIG. 6 also includes assigning (300) a server blade to one of a plurality of clock failover groups, providing (310) a plurality of independent clock signals to the clock generator of the server blade, wherein one of the plurality of independent clock signals is an active clock signal, detecting (320) a failover condition for the clock failover group assigned to the server blade, and switching (330) the active clock signal, in response to the detected failover condition, from one independent clock signal to another independent clock signal. In addition, the example of FIG. 6 is similar to the example of FIG. 4 in that the example of FIG. 6 also includes clock failover groups (302), server blade (200), clock failover group (304), independent clock signals (312), active clock signal (314), other server blades (322), and detected failover condition (324).

In the example of FIG. 6, detecting (320) a failover condition (324) for the clock failover group (304) assigned to the server blade (200) includes detecting (500) by the clock generator an error condition (504) for the active clock signal (314). As mentioned above, an error condition is a condition in which the active clock signal for a server blade is no longer suitable for timing operations on the server blade. Readers will recall from above that the active clock signal (314) is the particular independent clock signal among the plurality of independent clock signals (312) utilized for timing operations on the server blade (200) at a particular point in time. Detecting (500) by the clock generator an error condition (504) for the active clock signal (314) may be carried out by comparing metrics of the active clock signal to operational clock signal parameters. Operational clock signal parameters are parameters that specify the operational range for a clock signal usable by a clock generator to generate a system clock for a server blade. An error condition (504) may, therefore, exist when the metrics of the active clock signal are outside the operational range specified by the operational clock signal parameters.

In the example of FIG. 6, detecting (320) a failover condition (324) for the clock failover group (304) assigned to the server blade (200) includes generating (502) by the clock generator, in response to the detected error condition (324), a failover signal. Generating (502) by the clock generator, in response to the detected error condition (324), a failover signal may be carried out by transmitting an electric signal on an electric conductor that connects together all of the clock generators of the server blades assigned to the same clock failover group as described above with reference to FIG. 2. The remainder of the method of FIG. 6 may then continue to be carried out as discussed above with reference to FIG. 4.

As mentioned above, detecting a failover condition for the clock failover group assigned to the server blade may be carried out by detecting a failover signal generated by another clock generator. For further explanation, FIG. 7 sets forth a flow chart illustrating a further exemplary method for providing independent clock failover for scalable blade servers according to embodiments of the present invention that includes detecting (600) a failover signal generated by another clock generator.

Figure 7:
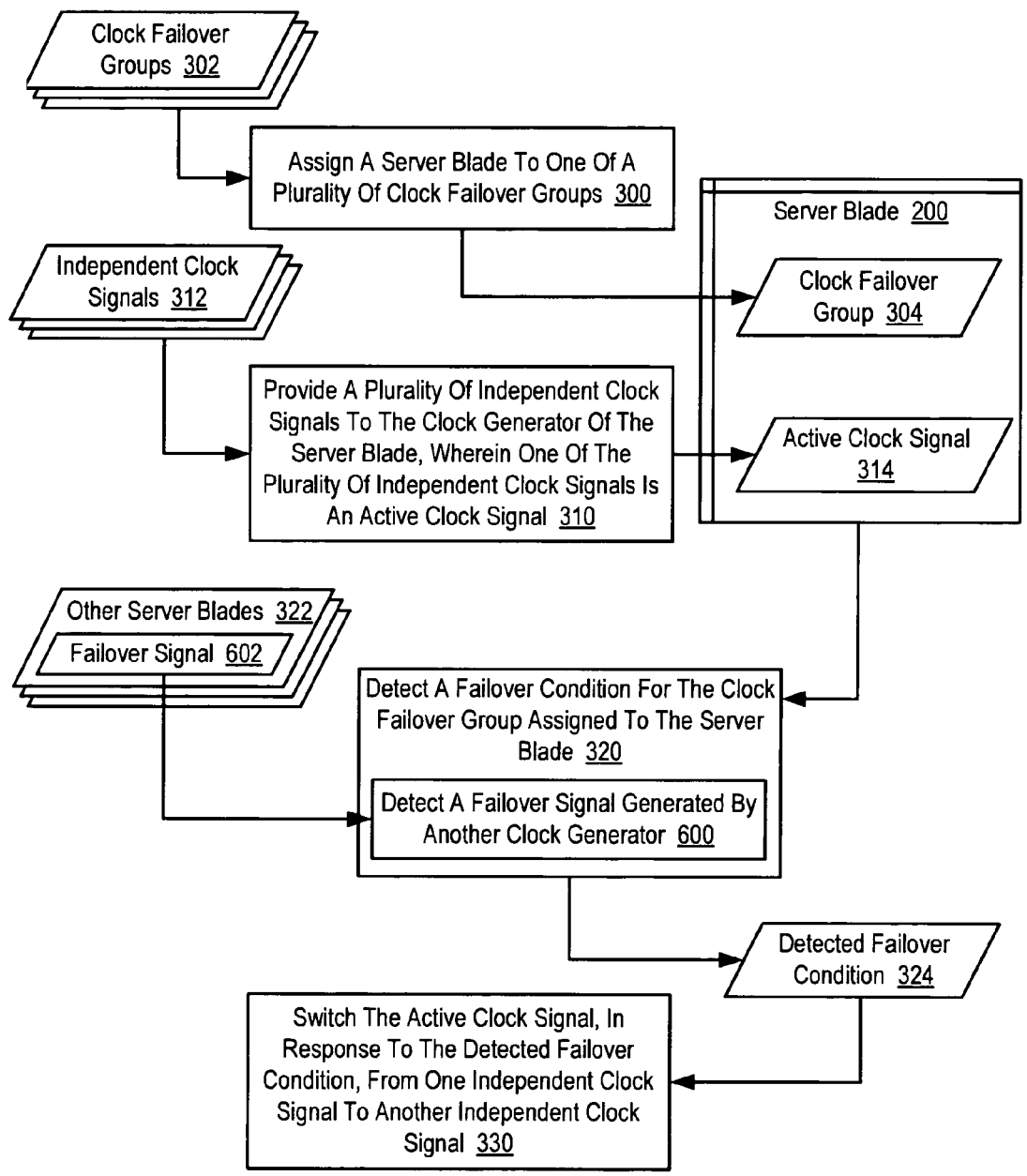
FIG. 7 sets forth a flow chart illustrating a further exemplary method for providing independent clock failover for scalable blade servers according to embodiments of the present invention.

The method of FIG. 7 is similar to the method of FIG. 4. That is, the method of FIG. 7 is similar to the method of FIG. 4 in that the method of FIG. 7 also includes assigning (300) a server blade to one of a plurality of clock failover groups, providing (310) a plurality of independent clock signals to the clock generator of the server blade, wherein one of the plurality of independent clock signals is an active clock signal, detecting (320) a failover condition for the clock failover group assigned to the server blade, and switching (330) the active clock signal, in response to the detected failover condition, from one independent clock signal to another independent clock signal. In addition, the example of FIG. 7 is similar to the example of FIG. 4 in that the example of FIG. 7 also includes clock failover groups (302), server blade (200), clock failover group (304), independent clock signals (312), active clock signal (314), other server blades (322), and detected failover condition (324).

In the example of FIG. 7, detecting (320) a failover condition (324) for the clock failover group (304) assigned to the server blade (200) includes detecting (600) a failover signal generated by another clock generator. Readers will recall from above that a failover signal is a signal generated by a server blade when an error condition occurs for the active clock signal. In the example of FIG. 7, other server blades (322) includes failover signal (602) that represents a failover signal generated by the clock generator of one of the other server blades represented by other server blades (322). Detecting (600) a failover signal generated by another clock generator according to the method of FIG. 7 may be carried out by receiving an electric signal on an electric conductor that connects together all of the clock generators of the server blades assigned to the same clock failover group as described above with reference to FIG. 2. The remainder of the method of FIG. 7 may then continue to be carried out as discussed above with reference to FIG. 4.

Exemplary embodiments of the present invention are described largely in the context of a fully functional computer system for providing independent clock failover for scalable blade servers. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for providing independent clock failover for scalable blade servers, the method comprising:
    assigning a server blade to one of a plurality of clock failover groups;
    providing a plurality of independent clock signals to a clock generator of the server blade, wherein one of the plurality of independent clock signals is an active clock signal;
    detecting a failover condition for the clock failover group to which the server blade is assigned, including:
        detecting, by the clock generator, an error condition for the active clock signal; and
        generating, by the clock generator for other clock generators of other server blades also assigned to the clock failover group, in response to the detected error condition, a failover signal; and
    switching the active clock signal, in response to the detected failover condition, from one independent clock signal to another independent clock signal.

2. The method of claim 1 wherein detecting the failover condition for the clock failover group to which the server blade is assigned further comprises detecting a failover signal generated by another clock generator of another server blade also assigned to the clock failover group.

3. The method of claim 1 wherein assigning the server blade to one of the plurality of clock failover groups further comprises assigning a server blade to one of the plurality of clock failover groups in dependence upon membership to a scalable group.

4. The method of claim 1 wherein assigning the server blade to one of a plurality of clock failover groups further comprises receiving from application provisioning software an assignment to one of the plurality of clock failover groups.

5. A system for providing independent clock failover for scalable blade servers, the system comprising a computer processor, a computer memory operatively coupled to the computer processor, the computer memory having disposed within it computer program instructions capable of:
   assigning a server blade to one of a plurality of clock failover groups;
   providing a plurality of independent clock signals to a clock generator of the server blade, wherein one of the plurality of independent clock signals is an active clock signal;
   detecting a failover condition for the clock failover group to which the server blade is assigned including:
      detecting, by the clock generator, an error condition for the active clock signal; and
      generating, by the clock generator for other clock generators of other server blades also assigned to the clock failover group, in response to the detected error condition, a failover signal; and
   switching the active clock signal, in response to the detected failover condition, from one independent clock signal to another independent clock signal.

6. The system of claim 5 wherein the detecting the failover condition for the clock failover group to which the server blade is assigned further comprises detecting a failover signal generated by another clock generator of another server blade also assigned to the clock failover group.

7. The system of claim 5 wherein the assigning the server blade to one of the plurality of clock failover groups further comprises assigning a server blade to one of the plurality of clock failover groups in dependence upon membership to a scalable group.

8. The system of claim 5 wherein the assigning the server blade to one of a plurality of clock failover groups further comprises receiving from application provisioning software an assignment to one of the plurality of clock failover groups.

9. A blade server chassis having independent clock failover capability, the blade server chassis comprising:
   a plurality of server blades;
   a management module that assigns each server blade to one of a plurality of clock failover groups;
   a plurality of independent clocks, each independent clock providing an independent clock signal to each server blade, wherein one of the independent clock signals is an active clock signal; and
   wherein each server blade further comprises a clock generator that detects a failover condition for the clock failover group to which the server blade is assigned of the clock generator, and switches the active clock signal, in response to the detected failover condition, from one independent clock signal to another independent clock signal, wherein the clock generator further comprises:
   an error detector that detects an error condition for the active clock signal; and
   a failover signal generator that generates a failover signal for other clock generators of other server blades also assigned to the clock failover group in response to a detected error condition.

10. The blade server chassis of claim 9 wherein the clock generator further comprises a failover signal detector that detects a failover signal generated by another clock generator of another server blade also assigned to the clock failover group.

11. The blade server chassis of claim 9 wherein the management module assigns a server blade to one of the plurality of clock failover groups in dependence upon membership to a scalable group.

12. The blade server chassis of claim 9 wherein the management module receives from application provisioning software an assignment to one of the plurality of clock failover groups.

* * * * *